US010458332B2

(12) United States Patent
Schwarz et al.

(10) Patent No.: US 10,458,332 B2
(45) Date of Patent: Oct. 29, 2019

(54) COOLED GAS TURBINE ENGINE COOLING AIR WITH COLD AIR DUMP

(71) Applicant: UNITED TECHNOLOGIES CORPORATION, Farmington, CT (US)

(72) Inventors: Frederick M. Schwarz, Glastonbury, CT (US); Nathan Snape, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 321 days.

(21) Appl. No.: 15/407,758

(22) Filed: Jan. 17, 2017

(65) Prior Publication Data

US 2018/0202363 A1 Jul. 19, 2018

(51) Int. Cl.
*F02C 7/18* (2006.01)
*F02C 3/04* (2006.01)
(Continued)

(52) U.S. Cl.
CPC .............. *F02C 7/185* (2013.01); *F01D 25/28* (2013.01); *F02C 3/04* (2013.01); *F02C 7/36* (2013.01);
(Continued)

(58) Field of Classification Search
CPC ...... F02C 7/08; F02C 7/16; F02C 7/18; F02C 7/185; F02C 7/36; F02C 3/04; F02C 9/18;
(Continued)

(56) References Cited

U.S. PATENT DOCUMENTS 5,392,614 A * 2/1995 Coffinberry ............... F02C 7/12
60/806
5,414,992 A 5/1995 Glickstein
(Continued)

FOREIGN PATENT DOCUMENTS

EP 0608142 A1 7/1994
EP 3095990 A1 11/2016

OTHER PUBLICATIONS

European Search Report for EP Application No. 18152098.2 dated May 30, 2018.

*Primary Examiner* — Craig Kim
(74) *Attorney, Agent, or Firm* — Carlson, Gaskey & Olds, P.C.

(57) ABSTRACT

A high pressure compressor has a downstream most end. A housing surrounds the compressor section and a turbine section. A low pressure turbine has a downstream most end. A first tap selectively taps high pressure cooling air from a location downstream of the downstream most end in the high pressure compressor and passes the high pressure cooling air through a heat exchanger. A second tap taps compressed air from a location upstream of the downstream most end in the high pressure compressor, and passes air over the heat exchanger, cooling the high pressure cooling air. A chamber is defined between the core engine housing and a nacelle airflow wall, and the second tap air flows through the chamber. The second tap air moves from the chamber into a core engine flow at a location downstream of the downstream most end of the low pressure turbine.

13 Claims, 2 Drawing Sheets

(51) Int. Cl.

| | |
|---|---|
| ***F01D 25/28*** | (2006.01) |
| ***F02C 7/36*** | (2006.01) |
| ***F02C 9/18*** | (2006.01) |
| *F02C 7/16* | (2006.01) |
| *F02C 7/08* | (2006.01) |

(52) U.S. Cl.
CPC .................. *F02C 9/18* (2013.01); *F02C 7/08* (2013.01); *F02C 7/16* (2013.01); *F02C 7/18* (2013.01); *F05D 2260/213* (2013.01); *Y02T 50/675* (2013.01)

(58) Field of Classification Search
CPC .. F01D 25/28; Y02T 50/675; F05D 2260/213; F02K 3/02
See application file for complete search history.

(56) References Cited

U.S. PATENT DOCUMENTS

| | | | | |
|---|---|---|---|---|
| 8,127,829 B2 | 3/2012 | Sabatino et al. | | |
| 8,776,869 B2 | 7/2014 | Barnes et al. | | |
| 9,243,850 B1 | 1/2016 | Bastian et al. | | |
| 2015/0275758 A1* | 10/2015 | Foutch | .................... | F02C 7/047 60/779 |
| 2015/0323186 A1* | 11/2015 | Xu | .......................... | F02C 7/224 60/782 |
| 2016/0160684 A1* | 6/2016 | Diaz | ....................... | F02C 7/185 415/145 |

* cited by examiner

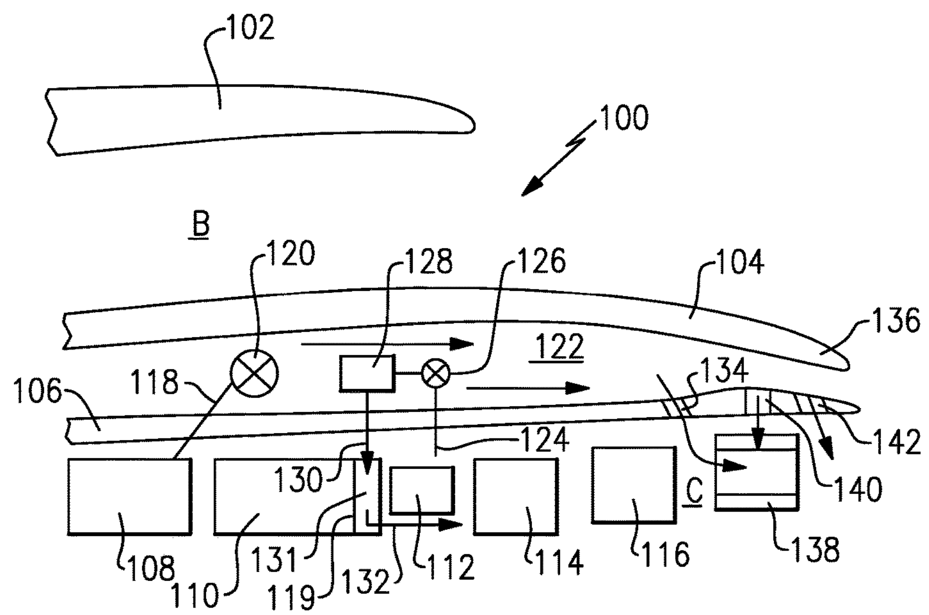
FIG.2
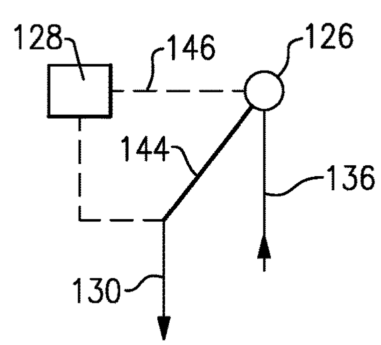
FIG.3
| | | | |
|---|---|---|---|
| 120 | OFF | ON | OFF |
| 126 | OFF | ON | OFF |
| | IDLE | TAKE-OFF | CRUISE |
FIG.4

COOLED GAS TURBINE ENGINE COOLING AIR WITH COLD AIR DUMP

BACKGROUND OF THE INVENTION

This application relates to a gas turbine engine in which cooling air is provided from an upstream location in a compressor to cool high pressure air to be utilized as cooling air for gas turbine engine components.

Gas turbine engines are known and typically include a fan delivering air into a bypass duct as propulsion air and also into a core engine. The air in the core engine enters a compressor where it is compressed and then delivered into a combustion section. The air is mixed with fuel and ignited and products of this combustion pass downstream over turbine rotors driving them to rotate.

Historically, a fan drive turbine rotated at a single speed with the fan. However, more recently, a gear reduction has been placed between the fan drive turbine and the fan rotor. This allows the fan to increase in diameter and rotate at slower speeds, which has many beneficial effects.

Also, the fan drive turbine is able to rotate at higher speeds. Temperatures within the gas turbine engine increase with this change for several reasons. Further, the pressure downstream of the combustor also increases.

As can be appreciated, components of the gas turbine engine and, in particular, those in the turbine section see very high temperatures. It is known to provide cooling air to cool those components. However, due to the increased pressure, it becomes desirable to use highly pressurized air as the cooling air such that it is able to move into the turbine section. The most pressurized air in the gas turbine engine is downstream of a high pressure compressor and it is typically hot.

Thus, cooling for this high pressure air becomes necessary. It has been proposed to cool this high pressure air in a heat exchanger sitting in the bypass duct. However, the fan pressure ratios delivered by the increased diameter fans are dropping and, thus, may not provide efficient cooling.

SUMMARY OF THE INVENTION

In a featured embodiment, a gas turbine engine comprises a compressor section including a low pressure compressor and a high pressure compressor, with a downstream most end defined in the high pressure compressor. A core engine housing surrounds the compressor section and a turbine section. There is a high pressure turbine and a low pressure turbine, and the low pressure turbine has a downstream most end. A first tap selectively taps high pressure cooling air from a location downstream of the downstream most end in the high pressure compressor and passes the high pressure cooling air through a heat exchanger. A second tap taps compressed air from a location upstream of the downstream most end in the high pressure compressor, and passes air over the heat exchanger, cooling the high pressure cooling air. A chamber is defined between the core engine housing and a nacelle airflow wall, and the second tap air flows through the chamber. The second tap air moves from the chamber into a core engine flow at a location downstream of the downstream most end of the low pressure turbine.

In another embodiment according to the previous embodiment, the high pressure cooling air returns into the core engine housing and is directed to cool the high pressure turbine downstream of the heat exchanger.

In another embodiment according to any of the previous embodiments, the high pressure cooling air passes through a strut downstream of the downstream most end of the high pressure compressor is directed to cool the high pressure turbine.

In another embodiment according to any of the previous embodiments, a high pressure valve is positioned on the first tap for the high pressure cooling air to control the flow of high pressure cooling air to the heat exchanger.

In another embodiment according to any of the previous embodiments, the high pressure valve selectively bypassing the high pressure cooling air around the heat exchanger and into the core engine housing to provide cooling air.

In another embodiment according to any of the previous embodiments, the heat exchanger is in the chamber.

In another embodiment according to any of the previous embodiments, the high pressure cooling air passes through a strut downstream of the downstream most end of the high pressure compressor to pass to cool the high pressure turbine.

In another embodiment according to any of the previous embodiments, a high pressure valve is positioned on the first tap for the high pressure cooling air to control the flow of high pressure cooling air to the heat exchanger.

In another embodiment according to any of the previous embodiments, the high pressure valve selectively bypassing the high pressure cooling air around the heat exchanger and into the core engine housing to provide cooling air.

In another embodiment according to any of the previous embodiments, a cool valve selectively blocks flow of the second tap air entering the chamber.

In another embodiment according to any of the previous embodiments, a high pressure valve is positioned on the first tap for the high pressure cooling air to control the flow of high pressure cooling air to the heat exchanger.

In another embodiment according to any of the previous embodiments, the high pressure valve selectively bypassing the high pressure cooling air around the heat exchanger and into the core engine housing to provide cooling air.

In another embodiment according to any of the previous embodiments, a cool valve selectively blocks flow of the second tap air entering the chamber.

In another embodiment according to any of the previous embodiments, the high pressure valve bypasses the high pressure cooling air around the heat exchanger and into the core engine housing when the gas turbine engine is operating at at least one of an idle and a cruise condition.

In another embodiment according to any of the previous embodiments, the low pressure turbine driving a fan rotor through a gear reduction.

In another embodiment according to any of the previous embodiments, a cool valve selectively blocks flow of the second tap air entering the chamber.

In another embodiment according to any of the previous embodiments, the cool valve blocks flow of the second tap air when the gas turbine engine is operating at at least one of an idle and a cruise condition.

In another embodiment according to any of the previous embodiments, the second tap air returns to the core exhaust flow at a location upstream of a turbine exhaust case.

In another embodiment according to any of the previous embodiments, the second tap air enters the core exhaust flow at a location within a turbine exhaust case.

In another embodiment according to any of the previous embodiments, the second tap air returns to the core exhaust flow at a location downstream of a turbine exhaust case.

These and other features may be best understood from the following drawings and specification.

BRIEF DESCRIPTION OF THE DRAWINGS

FIG. 2 shows details of an embodiment.

FIG. 3 shows a flow path for cooling air.

FIG. 4 is a valve control chart.

DETAILED DESCRIPTION

Figure 1:
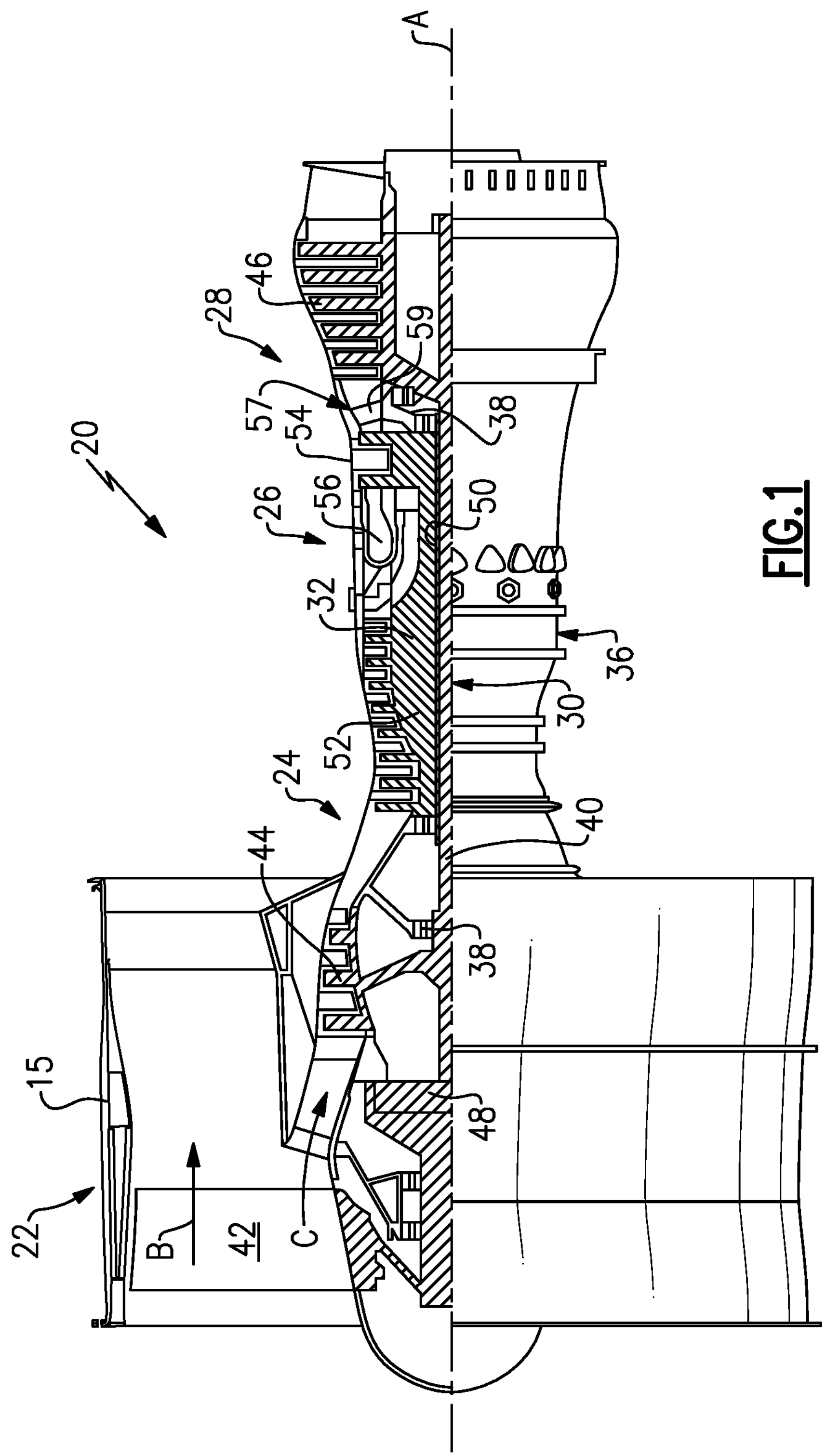
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Engine 100 is illustrated in FIG. 2. A fan case 102 surrounds a nacelle 104. An inner core housing 106 surrounds a core engine. The core engine includes a low pressure compressor 108 and a high pressure compressor 110. A combustor 112 is included between the compressor sections 108 and 110 and a high pressure turbine 114 and a low pressure turbine 116. As known, the low pressure turbine 116 drives a fan rotor (not shown in this Figure) through a gear reduction as illustrated in FIG. 1.

Air is tapped, as shown at 118, from a location upstream of a downstream most end 119 in the high pressure compressor 110. This air is at a relatively low temperature compared to air downstream of the downstream most point 119. The air from tap 118 passes through a valve 120, which can be shut off to block flow. When the valve 120 is opened, air moves into a chamber 122 between the nacelle 104 and the inner core housing 106. Cooling air is tapped at 124 from a location downstream of the downstream most end 119 of the high pressure compressor 110. As shown, it may be in a compressor diffusor generally positioned radially outwardly of the combustor 112. The air from tap 124 passes through a valve 126 and then into a heat exchanger 128. This air then returns, as shown at 130, at a location downstream of downstream most end 119. In one embodiment, the air passes through a strut 131 and then downstream, as shown at 132, towards the high pressure turbine 114 to be utilized as cooling air.

For purposes of the claims, valve 120 could be seen as a "cool" valve while valve 126 could be seen as a "high pressure valve."

The air from tap 118 passes over the heat exchanger 128 when the valve 120 is open. This cools the cooling air before it is returned to the return line 130 and the strut 131. However, the air from tap 118 flowing in the chamber 122 and downstream of a heat exchanger 128 becomes hot. Thus, it is desirable that downstream locations of the nacelle 104, such as at 136 are not exposed to this hot air.

To this end, this cooling air in the chamber 122 is returned into a core stream C downstream of the low pressure turbine 116, as shown at 134. In this manner, the downstream location 136 is not exposed to the hot air otherwise flowing through the chamber 122.

In an alternative embodiment, the air may pass into a turbine exhaust case 138, as shown at 140. Further, the air may be moved through opening 142 into a nozzle downstream of the turbine exhaust case 138.

As shown in FIG. 3 the valve 126 can be moved between two positions to selectively allow flow into a line 146 heading to the heat exchanger 128 or deliver the air into a line 144, which bypasses the heat exchanger 128 and delivers it directly into the return line 130.

As shown in FIG. 4, the valves 120 and 126 may be controlled such that cooling occurs in the heat exchanger 128 only during higher pressure conditions. As an example, at idle, the valves 120 and 126 are shown to be off. "Off" means valve 120 blocks flow, and valve 126 bypasses air around heat exchanger 128. The same is true at cruise. However, at takeoff and, perhaps, at climb, they would both be on such that the cooling occurs. "On" means valve 120 allows air flow and valve 126 allows air to flow to heat exchanger 128.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:

a compressor section including a low pressure compressor and a high pressure compressor, with a downstream most end defined in said high pressure compressor;

a core engine housing surrounding said compressor section and a turbine section, and there being a high pressure turbine and a low pressure turbine, and said low pressure turbine having a downstream most end;

a first tap for tapping high pressure cooling air from a location downstream of said downstream most end in said high pressure compressor and passing said high pressure cooling air through a heat exchanger, and there being a second tap for tapping compressed air from a location upstream of said downstream most end in said high pressure compressor, and said second tap air connected to pass over said heat exchanger, cooling said high pressure cooling air, with a chamber defined between said core engine housing and a nacelle airflow wall, and said second tap air flowing through said chamber;

said second tap air connected to move from said chamber into a core engine flow at a location downstream of said downstream most end of said low pressure turbine;

wherein a high pressure valve is positioned on said first tap for said high pressure cooling air to control the flow of high pressure cooling air to said heat exchanger; and wherein the high pressure valve selectively bypassing the high pressure cooling air around said heat exchanger and into said core engine housing to provide cooling air.

2. The gas turbine engine as set forth in claim 1, wherein the high pressure cooling air returns into said core engine housing and is directed to cool said high pressure turbine downstream of said heat exchanger.

3. The gas turbine engine as set forth in claim 2, wherein said high pressure cooling air passes through a strut downstream of said downstream most end of said high pressure compressor is directed to cool said high pressure turbine.

4. The gas turbine engine as set forth in claim 1, wherein said heat exchanger is in said chamber.

5. The gas turbine engine as set forth in claim 1, wherein said high pressure cooling air passes through a strut downstream of said downstream most end of said high pressure compressor to pass to cool said high pressure turbine.

6. The gas turbine engine as set forth in claim 1, wherein a cool valve selectively blocks flow of said second tap air entering said chamber.

7. The gas turbine engine as set forth in claim 6, wherein said high pressure valve bypasses the high pressure cooling air around said heat exchanger and into said core engine housing when the gas turbine engine is operating at at least one of an idle and a cruise condition.

8. The gas turbine engine as set forth in claim 1, wherein said low pressure turbine driving a fan rotor through a gear reduction.

9. The gas turbine engine as set forth in claim 7, wherein said cool valve blocks flow of said second tap air when the gas turbine engine is operating in at least one of an idle and a cruise condition.

10. The gas turbine engine as set forth in claim 1, wherein said second tap air returns to said core exhaust flow at a location upstream of a turbine exhaust case.

11. The gas turbine engine as set forth in claim 1, wherein said second tap air enters said core exhaust flow at a location within a turbine exhaust case.

12. The gas turbine engine as set forth in claim 1, wherein said second tap air returns to said core exhaust flow at a location downstream of a turbine exhaust case.

13. The gas turbine engine as set forth in claim 6, wherein said cool valve blocks flow of said second tap air when the gas turbine engine is operating in at least one of an idle and a cruise condition.

* * * * *